US012635004B2

(12) United States Patent
Wang et al.

(10) Patent No.: US 12,635,004 B2
(45) Date of Patent: May 19, 2026

(54) DEVICE INTERACTION METHOD AND CORE NETWORK DEVICE

(71) Applicant: VIVO MOBILE COMMUNICATION CO., LTD., Dongguan (CN)

(72) Inventors: Wen Wang, Dongguan (CN); Zhenhua Xie, Dongguan (CN); Yanxia Zhang, Dongguan (CN); Xiaowan Ke, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 885 days.

(21) Appl. No.: 17/954,691

(22) Filed: Sep. 28, 2022

(65) Prior Publication Data

US 2023/0020344 A1 Jan. 19, 2023

Related U.S. Application Data

(63) Continuation of application No. PCT/CN2021/091177, filed on Apr. 29, 2021.

(30) Foreign Application Priority Data

Apr. 30, 2020 (CN) .......................... 202010368326.5

(51) Int. Cl.
*H04W 76/10* (2018.01)
*H04W 72/23* (2023.01)

(52) U.S. Cl.
CPC ........... *H04W 76/10* (2018.02); *H04W 72/23* (2023.01)

(58) Field of Classification Search
CPC .............................. H04W 76/10; H04W 72/23
(Continued)

(56) References Cited

U.S. PATENT DOCUMENTS

2016/0330603 A1* 11/2016 Chuang .............. H04B 7/15507
2018/0076879 A1 3/2018 Ouyang et al.
(Continued)

FOREIGN PATENT DOCUMENTS

CN 106162803 A 11/2016
CN 106304036 A 1/2017
(Continued)

OTHER PUBLICATIONS

Translation of CN-110519826-A.*
(Continued)

*Primary Examiner* — Christopher R Crompton
(74) *Attorney, Agent, or Firm* — Foley & Lardner LLP

(57) ABSTRACT

Embodiments of this application provide a device interaction method and a core network device. The method includes: receiving, by a first core network device, identifier information of at least one UE sent by a first device, where the at least one UE includes at least one of the following: a UE that has established UE-to-network relay connection with a first UE and a UE that is to establish UE-to-network relay connection with the first UE; and interacting, by the first core network device based on identifier information of a second UE, with a second core network device, where the second UE is any one of the at least one UE; where the first core network device is a core network device serving the first UE, and the second core network device is a core network device serving the second UE.

15 Claims, 6 Drawing Sheets

(58) Field of Classification Search
USPC ......................................................... 370/329
See application file for complete search history.

(56) References Cited

U.S. PATENT DOCUMENTS

| | | |
|---|---|---|
| 2019/0335332 A1 | 10/2019 | Ying et al. |
| 2020/0100308 A1 | 3/2020 | Lee et al. |
| 2021/0076301 A1 | 3/2021 | Yu |
| 2021/0368473 A1 | 11/2021 | Liu et al. |

FOREIGN PATENT DOCUMENTS

| | | | | |
|---|---|---|---|---|
| CN | 107182061 A | 9/2017 | | |
| CN | 109246688 A | 1/2019 | | |
| CN | 109547955 A | 3/2019 | | |
| CN | 110519826 A | * 11/2019 | ............ | H04W 76/11 |
| WO | 2017128306 A1 | 8/2017 | | |
| WO | 2018/126452 A1 | 7/2018 | | |

OTHER PUBLICATIONS

The State Intellectual Property Office of People's Republic of China, First Office Action for Chinese Patent Application No. 202010368326.5 dated Dec. 7, 2022.
European Patent Office, Extended European Search Report for European Patent Application No. 21797172.0 dated Aug. 21, 2023.
China National Intellectual Property Administration, International Search Report issued in corresponding Application No. PCT/CN2021/091177, mailed Jul. 27, 2021.
Huawei, et al., "Solution for Key Issue #3: Indirect Communication via DE-to-Network Relay," SA WG2 Meeting #136 S2-1912466, Nov. 22, 2019. See ISR.

\* cited by examiner

300

500

DEVICE INTERACTION METHOD AND CORE NETWORK DEVICE

CROSS-REFERENCE TO RELATED APPLICATIONS

This application is a continuation of International Application No. PCT/CN2021/091177, filed on Apr. 29, 2021, which claims priority to Chinese Patent Application No. 202010368326.5, filed in China on Apr. 30, 2020, which is incorporated herein by reference in its entirety.

TECHNICAL FIELD

Embodiments of this application relate to the field of communication technologies, and in particular, to a device interaction method and a core network device.

BACKGROUND

With development of communication technologies, in the fifth generation proximity services (fifth generation proximity services, 5G_ProSe) technology, connection from a user equipment (user equipment, UE) to a network relay (UE-to-network relay) may be implemented through a layer 2 (layer-2) manner.

In the layer 2 manner, an architecture of UE-to-network relay communication may include two sets of core network devices, for example, a relay access and mobility management function (access and mobility management function, AMF) entity and a remote AMF entity.

However, as this communication architecture includes a relay AMF entity and a remote AMF entity, how interaction is implemented between the AMF entity and the remote AMF entity is an urgent problem to be solved.

SUMMARY

Embodiments of this application provide a device interaction method and a core network device.

According to a first aspect of the present application, a device interaction method is provided. The method includes: receiving, by a first core network device, identifier information of at least one UE sent by a first device, where the at least one UE includes at least one of the following: a UE that has established UE-to-network relay connection with a first UE and a UE that is to establish UE-to-network relay connection with the first UE; and interacting, by the first core network device based on identifier information of a second UE, with a second core network device, where the second UE is any one of the at least one UE; where the first core network device is a core network device serving the first UE, and the second core network device is a core network device serving the second UE.

According to a second aspect of the present application, a core network device is provided. The core network device may be a first core network device, and the core network device includes a receiving module and an interacting module. The receiving module is configured to receive identifier information of at least one user equipment UE sent by a first device, where the at least one UE includes at least one of the following: a UE that has established UE-to-network relay connection with a first UE and a UE that is to establish UE-to-network relay connection with the first UE. The interacting module is configured to: after the receiving module receives the identifier information of the at least one UE, interact with a second core network device based on identifier information of a second UE, where the second UE is any one of the at least one UE.

The first core network device is a core network device serving the first UE, and the second core network device is a core network device serving the second UE.

According to a third aspect of the present application, a core network device is provided, which includes a processor, a memory, and a program or instructions stored in the memory and capable of running on the processor. When the program or instructions are executed by the processor, the steps of the device interaction method according to the first aspect are implemented.

According to a fourth aspect of the present application, a readable storage medium is provided. The readable storage medium stores a program or instructions, and when the program or instructions are executed by a processor, the steps of the device interaction method according to the first aspect or the second aspect are implemented.

According to a fifth aspect of the present application, a chip is provided. The chip includes a processor and a communication interface, where the communication interface is coupled to the processor, and the processor is configured to run a program or instructions, so as to implement the steps of the device interaction method according to the first aspect.

In the embodiments of this application, a first core network device may receive identifier information of at least one UE sent by a first device, where the at least one UE includes at least one of the following: a UE that has established UE-to-network relay connection with a first UE and a UE that is to establish UE-to-network relay connection with the first UE. The first core network device interacts with a second core network device based on identifier information of a second UE, where the second UE is any one of the at least one UE. The first core network device is a core network device serving the first UE, and the second core network device is a core network device serving the second UE. With this solution, in UE-to-network relay communication, a core network device serving a UE can be determined based on identifier information of the UE. Therefore, the first core network device can determine, based on the received identifier information of the at least one UE, the second core network device serving a UE in the at least one UE, so as to interact with the second core network device. For example, a relay core network device can implement interaction with a remote core network device serving a remote UE based on received identifier information of the remote UE, or a remote core network device can implement interaction with a relay core network device serving a relay UE based on received identifier information of the relay UE. In this way, interaction between a relay core network device and a remote core network device can be implemented through the device interaction method provided in the embodiments of this application.

DESCRIPTION OF EMBODIMENTS

Figure 1:
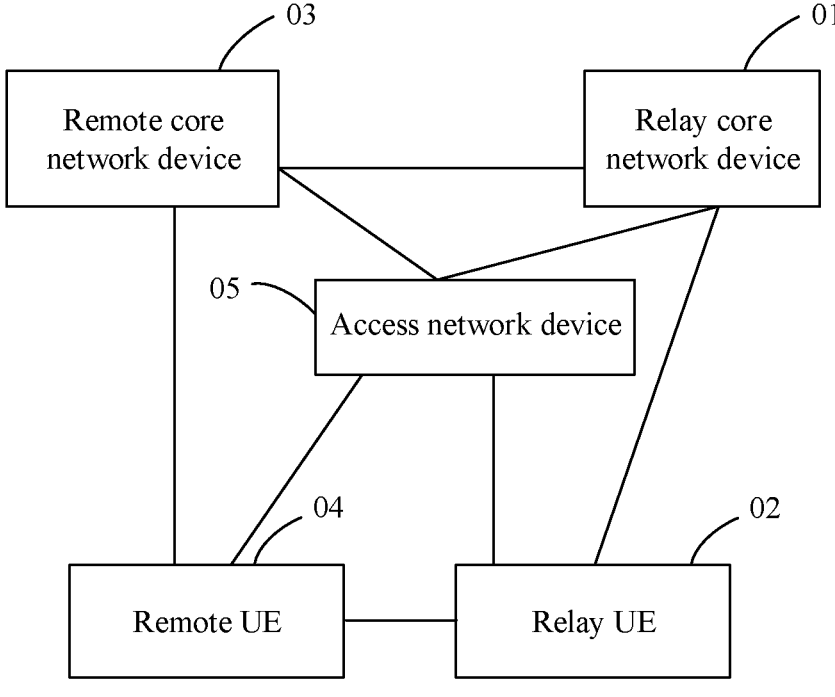
FIG. 1 is a schematic diagram of an architecture of a communication system according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the data used in this way is interchangeable in appropriate circumstances so that the embodiments of this application can be implemented in other orders than the order illustrated or described herein. In addition, in the specification and claims, "and/or" represents at least one of connected objects, and the character "/" typically presents an "or" relationship between the associated objects.

In the embodiments of this application, the word such as "an example" or "for example" is used to represent giving an example, an instance, or an illustration. Any embodiment or design solution described as "an example" or "for example" in the embodiments of this application shall not be interpreted to be more preferential or advantageous than other embodiments or design solutions. To be precise, the terms such as "an example" or "for example" are intended to present a related concept in a specific manner.

In the descriptions of the embodiments of this application, "a plurality of" means two or more, unless otherwise specified. For example, a plurality of core network devices mean two or more core network devices.

The following first describes terms/nouns included in the embodiments of this application.

Relay core network device: a core network device that serves a UE-to-network relay UE in UE-to-network relay communication, for example, a relay AMF entity.

Relay UE (that is, relay UE): a UE that implements communication between a remote UE and an access network device as a relay device of the remote UE in UE-to-network relay communication, that is, a UE-to-network relay UE in UE-to-network relay communication.

Remote core network device: a core network device that serves a remote UE in UE-to-network relay communication, for example, a remote AMF entity.

Remote UE (that is, remote UE): a UE that needs relaying by a relay UE to communicate with an access network device in UE-to-network relay communication.

Access network device of relay UE: an access network device that serves a UE-to-network relay UE in UE-to-network relay communication, for example, a 5G system node base (gNB) and an evolved NodeB (evolved NodeB, eNB).

The embodiments of this application provide a device interaction method and a core network device. A first core network device may receive identifier information of at least one UE sent by a first device, where the at least one UE includes at least one of the following: a UE that has established UE-to-network relay connection with a first UE and a UE that is to establish UE-to-network relay connection with the first UE. The first core network device interacts with a second core network device based on identifier information of a second UE, where the second UE is any one of the at least one UE. The first core network device is a core network device serving the first UE, and the second core network device is a core network device serving the second UE. With this solution, in UE-to-network relay communication, a core network device serving a UE can be determined based on identifier information of the UE. Therefore, the first core network device can determine, based on the received identifier information of the at least one UE, the second core network device serving a UE in the at least one UE, so as to interact with the second core network device. For example, a relay core network device can implement interaction with a remote core network device serving a remote UE based on received identifier information of the remote UE, or a remote core network device can implement interaction with a relay core network device serving a relay UE based on received identifier information of the relay UE. In this way, interaction between a relay core network device and a remote core network device can be implemented through the device interaction method provided in the embodiments of this application.

FIG. 1 is a schematic diagram of an architecture of a communication system according to an embodiment of this application. As shown in FIG. 1, the communication system may include a relay core network device 01, a relay UE 02, a remote core network device 03, a remote UE 04, and an access network device 05. The remote UE 04 may communicate with the access network device 05 via the relay UE 02.

The relay UE 02 may be a UE having a relay capability or other devices having a relay capability, for example, a road side unit (road side unit, RSU).

It should be noted that in this embodiment of this application, connection between the devices shown in FIG. 1 may be wireless or wired.

The UE is a device that provides a user with voice and/or data connectivity, a handheld device with a wired/wireless connection function, or another processing device connected to a wireless modem. The UE may communicate with one or more core network devices via a radio access network (radio access network, RAN). The UE may be a mobile terminal, such as a mobile phone (or referred to as a "cellular" phone) and a computer with a mobile terminal, or may be a portable, pocket-sized, handheld, computer built-in, or vehicle-mounted mobile apparatus that exchanges voice and/or data with the RAN. For example, the UE is a device such as a personal communication service (personal communication service, PCS) phone, a cordless telephone set, a session initiation protocol (SIP) phone, a wireless local loop (wireless local loop, WLL) station, or a personal digital assistant (personal digital assistant, PDA). The UE may also be referred to as a user agent (user agent), a terminal device, or the like.

The access network device is a device deployed in the RAN and configured to provide a wireless communication function for the UE. In this embodiment of this application, the access network device may be a base station, and the base station may include various forms of macro base stations, micro base stations, relay stations, access points, and the like. In systems using different radio access technologies, a device having the function of a base station may have different names. For example, such device may be referred to as a 5G system node base (gNB) in a fifth generation mobile communication (5-generation, 5G) system, may be referred to as an evolved NodeB (eNB) in a fourth-generation wireless communication (4-generation, 4G) system, such as a long-term evolution (long term evolution, LTE) system, or may be referred to as a node base (Node B) in a third-generation mobile communication (3-generation, 3G) system. With evolution of communication technologies, the name "base station" may change.

The core network device may be a core network element located at a network side, for example, an AMF entity or a policy control function (Policy Control Function, PCF) entity.

The following uses specific embodiments and application scenarios thereof as examples for description of the device interaction method provided in the embodiments of this application with reference to the accompanying drawings.

Figure 2:
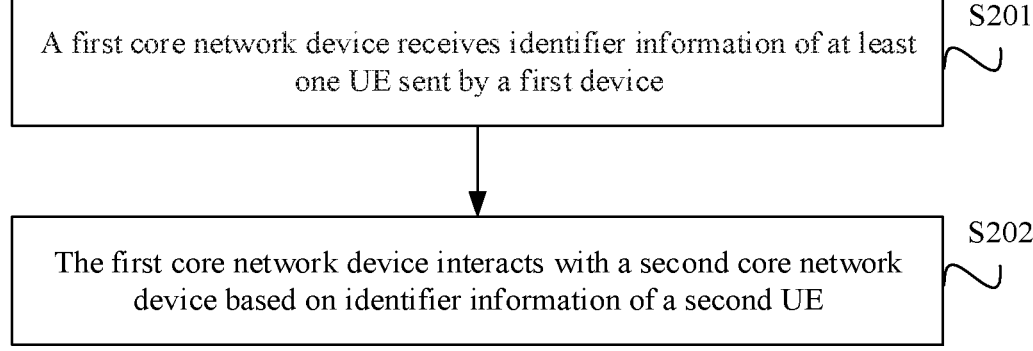
FIG. 2 is a schematic flowchart of a device interaction method according to an embodiment of this application.

As shown in FIG. 2, an embodiment of this application provides a device interaction method. The method may be applied to the wireless communication system shown in FIG. 1 and may include the following steps S201 and S202.

S201. A first core network device receives identifier information of at least one UE sent by a first device.

The at least one UE may include at least one of the following: a UE that has established UE-to-network relay connection with a first UE and a UE that is to establish UE-to-network relay connection with the first UE. The first core network device may be a core network device serving the first UE.

S202. The first core network device interacts with a second core network device based on identifier information of a second UE.

The second UE may be any one of the at least one UE, and the second core network device may be a core network device serving the second UE.

In this embodiment of this application, in UE-to-network relay communication, the first device can transmit the first core network device identifier information of a UE (that is, the at least one UE) that has established and/or is to establish UE-to-network relay connection with the first UE. In this way, after receiving the identifier information of the at least one UE, the first core network device can interact with the second core network device serving the second UE based on the identifier information of the second UE in the at least one UE.

In this embodiment of this application, in a first implementation, the first core network device is a relay core network device, and the first UE is a relay UE; and the second core network device may be a remote core network device, and the second UE is a remote UE.

In a second implementation, the first core network device is a remote core network device, and the first UE is a remote UE; and the second core network device may be a relay core network device, and the second UE is a relay UE.

Optionally, in this embodiment of this application, the first core network device may be the first UE or an access network device.

The access network device may serve a relay UE, and the relay UE may be the first UE or the second UE.

In this embodiment of this application, for the first implementation, the first device may be the relay UE or an access network device of the relay UE; and for the second implementation, the first device may be the remote UE or an access network device of the relay UE.

Optionally, in this embodiment of this application, when the first core network device is a relay core network device, the at least one UE may include a remote UE that has established UE-to-network relay connection with the relay UE (that is, the first UE) and a remote UE that is to establish UE-to-network relay connection with the relay UE.

In this embodiment of this application, when the relay UE receives a non-direct connection establishment request (or a direct connection establishment request) from a remote UE, this remote UE is a remote UE that is to establish UE-to-network relay connection with the relay UE.

It should be noted that in this embodiment of this application, the non-direct connection establishment request or direct connection establishment request may be used to indicate that the remote UE is requesting to establish UE-to-network relay connection with the relay UE.

In this embodiment of this application, the remote UE that has established UE-to-network relay connection with the relay UE may include a remote UE that is currently connected to or served by the relay UE. The remote UE that is to establish UE-to-network relay connection with the relay UE may include a remote UE that the relay UE is to establish connection with or is about to serve and a remote UE with which the relay UE is establishing connection.

The remote UE that has established UE-to-network relay connection with the relay UE and the remote UE that is to establish UE-to-network relay connection with the relay UE may be collectively referred to as remote UEs that are associated with the relay UE for UE-to-network relay communication.

Optionally, in this embodiment of this application, when the first core network device is a remote core network device, the at least one UE may include a relay UE that has established UE-to-network relay connection with the remote UE (that is, the first UE).

Optionally, in this embodiment of this application, when the at least one UE is a plurality of UEs, the identifier information of the at least one UE received by the first core network device may be in a list form. In other words, the first core network device receives a list including the identifier information of the at least one UE.

Optionally, in this embodiment of this application, the identifier information of the at least one UE may be carried in a NAS message, an N2 interface message, or a response message corresponding to an identifier request message.

Optionally, in this embodiment of this application, when the first device is the first UE, the identifier information of the at least one UE may be carried in a NAS message or a response message corresponding to an identifier request message; and when the first device is an access network device of the relay UE, the identifier information of the at least one UE may be carried in an N2 interface message or a response message corresponding to an identifier request message.

Optionally, in this embodiment of this application, identifier information of any one of the at least one UE may be any one of the following:

a 5G globally unique temporary identifier (5G globally unique temporary identifier, 5G-GUTI);

a 5G S-temporary mobile subscription identifier (5G S-temporary mobile subscription identifier, 5G-S-TMSI);

an application layer identity (application layer ID);

a prose relay user key identity (ProSe relay user key identity, PRUK ID);

a permanent equipment identifier (permanent equipment identifier, PEI);

a subscription concealed identifier (subscription concealed identifier, SUCI); and a subscription permanent identifier (subscription permanent identifier, SUPI).

Optionally, in this embodiment of this application, when the first device is the first UE, the identifier information of any one of the at least one UE may be a 5G-GUTI, a 5G-S-TMSI, an application layer identity, a PRUK ID, a PEI, a SUCI, or a SUPI.

Optionally, in this embodiment of this application, when the first device is an access network device of the relay UE, the identifier information of any one of the at least one UE may be a 5G-GUTI, a 5G-S-TMSI, an application layer identity, or a PRUK ID.

Optionally, in this embodiment of this application, after receiving the identifier information of the at least one UE, the first core network device may determine the second core network device based on the identifier information of the second UE (any one of the at least one UE), so that the first core network device can transmit the second core network device a message requesting to obtain a context of the second UE (for example, a first request message in this embodiment of this application), and after receiving the message, the second core network device can transmit the context of the second UE to the first core network device. In this way, the first core network device can interact with the second core network device.

For example, in this embodiment of this application, the foregoing S202 may be implemented through the following steps S202a to S202c.

S202a. The first core network device determines the second core network device based on the identifier information of the second UE.

S202b. The first core network device transmits a first request message to the second core network device.

The first request message may carry the identifier information of the second UE, and the first request message may be used to request to obtain a context of the second UE.

S202c. The first core network device receives the context of the second UE sent by the second core network device.

In this embodiment of this application, after receiving the identifier information of the at least one UE, the first core network device may determine the second core network device based on the identifier information of the second UE; and after determining the second core network device, the first core network device transmits the first request message to the second core network device to request to obtain the context of the second UE. After receiving the first request message, the second core network device may transmit the context of the second UE to the first core network device, so that the first core network device can receive the context of the second UE. In this way, the first core network device can interact with the second core network device.

Optionally, in this embodiment of the this application, the first core network device may retrieve, based on the identifier information of the second UE, information of the core network device serving the second UE from a network repository function (Network Repository Function, NRF) entity, so as to determine the second core network device.

For example, it is assumed that the first core network device is a relay AMF entity, the second UE is a remote UE, and the identifier information of the second UE is 5G-GUTI or 5G-S-TMSI of the remote UE, the first core network device may retrieve, based on the 5G-GUTI or 5G-S-TMSI of the remote UE, information of a remote AMF entity serving the remote UE from the NRF entity. In this way, after determining the remote AMF entity, the relay AMF entity may transmit the remote AMF entity a request message requesting to obtain a context of the remote UE (that is, the first request message), so as to interact with the remote AMF entity.

It should be noted that the first core network device may further implement any possible interaction with the second core network device based on the identifier information of the second UE. This may be determined depending on an actual use requirement and is not limited in this embodiment of this application.

With the device interaction method provided in this embodiment of this application, in UE-to-network relay communication, a core network device serving a UE can be determined based on identifier information of the UE. Therefore, a first core network device can determine, based on received identifier information of at least one UE, a second core network device serving a UE in the at least one UE, so as to interact with the second core network device. For example, a relay core network device can implement interaction with a remote core network device serving a remote UE based on received identifier information of the remote UE, or a remote core network device can implement interaction with a relay core network device serving a relay UE based on received identifier information of the relay UE. In this way, interaction between a relay core network device and a remote core network device can be implemented through the device interaction method provided in the embodiments of this application.

Optionally, in this embodiment of this application, after the foregoing S202c, the device interaction method provided in this embodiment of this application may further include the following S203.

S203. The first core network device determines, based on the context of the second UE, whether the second UE is granted to implement UE-to-network relay communication.

In this embodiment of this application, after receiving the context of the second UE sent by the second core network device, the first core network device may authenticate the second UE based on the context of the second UE. Alternatively, the first core network device may determine, based on the context of the second UE, whether the second UE is granted to implement UE-to-network relay communication.

It can be understood that the context of the second UE may include grant information for the second UE.

In this embodiment of this application, when the first core network device is the relay core network device, the first UE is the relay UE, the second UE is the remote UE, and the second UE is the UE that is to establish UE-to-network relay connection with the first UE, after receiving a context of the remote UE, the relay core network device may determine whether the remote UE is granted to implement UE-to-network relay communication. Alternatively, if the remote UE is granted to implement UE-to-network relay communication, the relay UE may establish UE-to-network connection with the remote UE; and if the remote UE is not granted to implement UE-to-network relay communication, the relay UE may reject (or ignore) a non-direct connection establishment request from the remote UE.

It can be understood that a relay AMF entity determining whether a remote UE is granted to implement UE-to-network relay communication may be the relay AMF entity determining whether the remote UE can serve as a remote UE of the UE-to-network relay.

Optionally, in this embodiment of this application, before the foregoing S201, the device interaction method provided in this embodiment of this application may further include the following S204.

S204. The first core network device transmits an identifier request (identifier request) message to the first device.

The identifier request message may be used to request to obtain identifier information of a UE that has established and/or is to establish UE-to-network relay connection with the first UE.

In this embodiment of this application, before receiving the identifier information of the at least one UE sent by the first device, the first core network device may transmit the identifier request message to the first device, so as to obtain from the first device the identifier information of the UE that has established and/or is to establish UE-to-network relay connection with the first UE. In this way, after receiving the identifier request message, the first device can transmit the identifier information of the at least one UE to the first core network device.

Optionally, in this embodiment of this application, identifier information of the first UE may be 5G-GUTI of the first UE or 5G-S-TMSI of the first UE. This may be determined depending on an actual requirement and is not limited in this embodiment of this application.

Optionally, in this embodiment of this application, the identifier request message may carry the identifier information of the first UE.

Optionally, in this embodiment of this application, in a case that the first device is the access network device of the relay UE, the first core network device may carry the identifier information of the first UE in the identifier request message, so as to request to obtain the identifier information of the UE that has established and/or is to establish UE-to-network relay connection with the first UE. In this way, after the access network device receives the identifier request message, the access network device can transmit the first core network device the identifier information of the UE that has established and/or is to establish UE-to-network relay connection with the first UE (that is, the identifier information of the at least one UE).

In this embodiment of this application, in a case that the first device has received the identifier request message, the first device may transmit the first core network device the identifier information of the at least one UE through a response message corresponding to the identifier request message.

Optionally, in this embodiment of this application, the response message corresponding to the identifier request message may further carry the identifier information of the first UE.

In this embodiment of this application, as the access network device may serve a plurality of relay UEs, the access network device may clearly notify the first core network device, by having the identifier information of the first UE carried in the response message corresponding to the identifier request message, that the second UE is the UE that is associated with the first UE for UE-to-network relay communication.

For example, it is assumed that the first core network device is a relay core network device, the first device is a RAN of a relay UE, when the RAN transmits the relay core network device identifier information of a remote UE that is associated with the relay UE for UE-to-network relay communication, the RAN may also transmit the relay core network device identifier information of the relay UE (for example, a 5G-GUTI or a 5G-S-TMSI of the relay UE), so as to clearly notify the relay core network device which relay UE the remote UE is associated with for UE-to-network relay communication.

Optionally, in this embodiment of this application, after the foregoing S201, the device interaction method provided in this embodiment of this application may further include the following S205 to S207.

S205. The first core network device transmits a second request message to a third core network device.

The second request message carries the identifier information of the second UE, and the second request message may be used to request to obtain grant information for the second UE.

S206. The first core network device receives grant information for the second UE sent by the third core network device.

S207. The first core network device determines, based on the grant information for the second UE, whether the second UE is granted to implement UE-to-network relay communication.

In this embodiment of this application, after receiving the identifier information of the at least one UE, the first core network device may transmit the second request message to the third core network device, so as to request to obtain the grant information for the second UE. In this way, after receiving the second request message, the third core network device may transmit the grant information for the second UE to the first core network device. Therefore, after receiving the grant information for the second UE, the first core network device can determine whether the second UE is granted to implement UE-to-network relay communication.

Optionally, for the foregoing S205 to S207, the identifier information of the second UE may be SUCI of the second UE or SUPI of the second UE. This may be determined depending on an actual requirement and is not limited in this embodiment of this application.

Optionally, in this embodiment of this application, the third core network device may be the same device as the first core network device, or may be a different device than the first core network device. This may be determined depending on an actual requirement and is not limited in this embodiment of this application.

Optionally, in this embodiment of this application, the third core network device may be a unified data management (unified data management) entity.

Certainly, in actual implementation, the third core network device may alternatively be any other possible entity. This may be determined depending on an actual use requirement and is not limited in this embodiment of this application.

For example, it is assumed that the first core network device is a relay core network device, the first device is a relay UE, and the third core network device is a UDM entity, if identifier information of at least one UE sent by the relay UE to the relay core network device is SUCI or SUPI of a remote UE, the relay core network device may obtain, based on the SUCI or SUPI of a remote UE, grant information for the remote UE through the UDM entity. Therefore, the relay core network device may determine, based on the grant information for the remote UE, whether the remote UE is granted to implement UE-to-network relay communication.

Alternatively, when the remote UE is a UE that is to establish UE-to-network relay connection with the relay UE, the first core network device may determine, based on the grant information for the remote UE, whether the remote UE is granted to implement UE-to-network relay communication. If the remote UE is granted to implement UE-to-network relay communication, the relay UE may establish UE-to-network relay connection with the remote UE; and if the remote UE is not granted to implement UE-to-network relay communication, the relay UE may reject (or ignore) a non-direct connection establishment request from the remote UE.

To describe the embodiments of this application more clearly, the following embodiments uses Embodiment 1, Embodiment 2, Embodiment 3, and Embodiment 4 below as examples for description of different application scenarios of the device interaction method provided in the embodiments of this application.

Embodiment 1: The first core network device is a relay AMF entity, and the first UE is a relay UE; and the second core network device is a remote core network device, the second UE is a remote UE, and the first device is the relay UE.

In Embodiment 1, the relay AMF entity obtains from the relay UE identifier information of the remote UE (for example, 5G-GUTI of the remote UE), retrieves information of the remote AMF entity based on the identifier information of the remote UE, and interacts with the remote AMF entity to obtain a context of the remote UE, so as to authenticate the remote UE.

Figure 3:
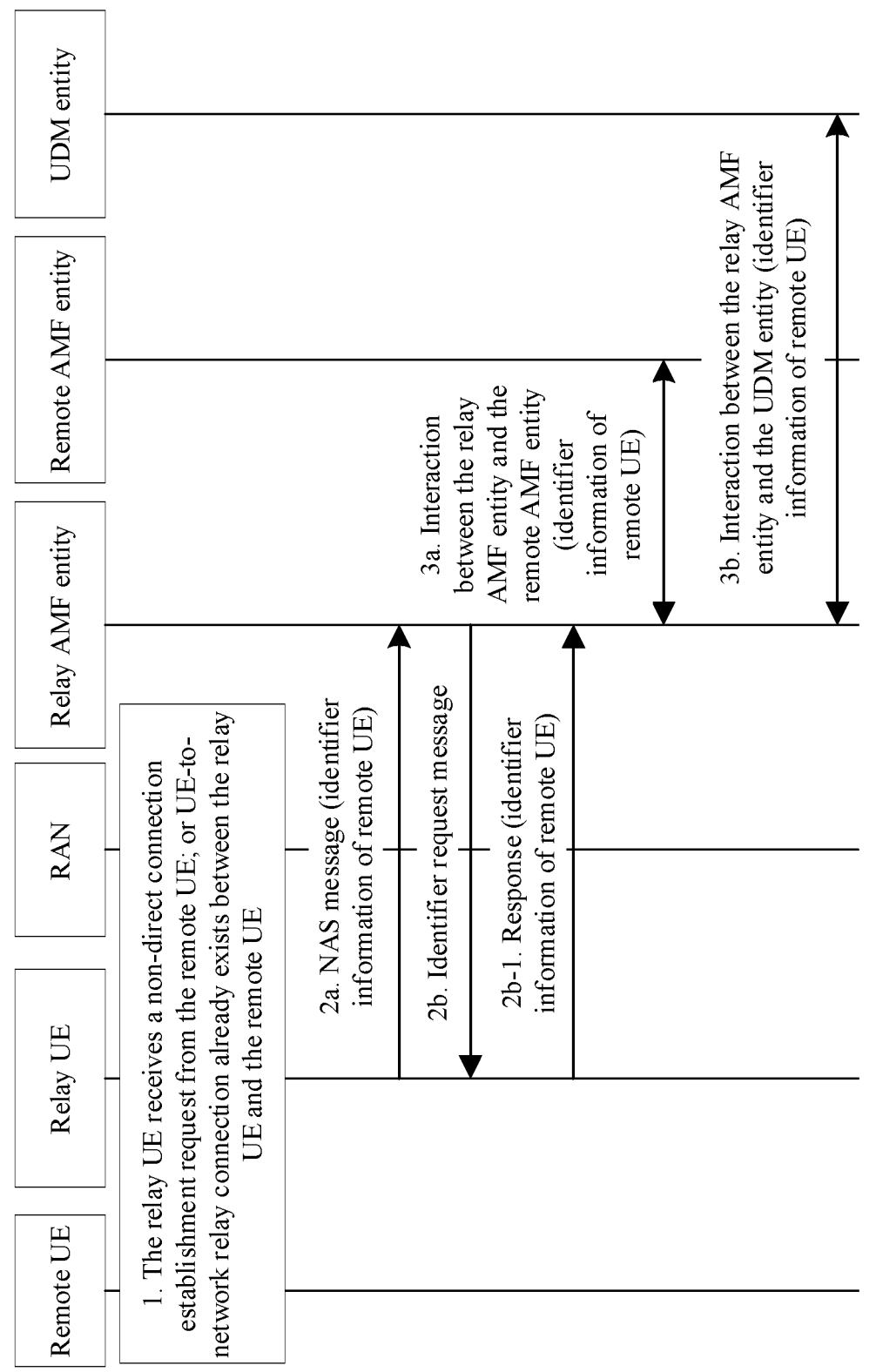
FIG. 3 is a first schematic flowchart of application of a device interaction method according to an embodiment of this application.

The following describes Embodiment 1 with reference to FIG. 3.

As shown in FIG. 3, in Step 1, the relay UE receives a non-direct connection establishment request from the remote UE; or UE-to-network relay connection already exists between the relay UE and the remote UE.

In an implementation, in Step 2a, the relay UE transmits identifier information of the remote UE to the relay AMF entity by using a NAS message.

The identifier information of the remote UE may be 5G-GUTI, 5G-S-TMSI, PEI, SUCI, application layer identity, SUPI, PRUK ID, or the like of the remote UE.

In another implementation, in Step 2b, the relay AMF entity transmits an identifier request (identifier request) message to the relay UE, where the identifier request message is used to request the relay UE to provide identifier information of a remote UE that is currently connected to or served by the relay UE.

In Step 2b-1, after receiving the identifier request message sent by the relay AMF entity, the relay UE transmits identifier information of the remote UE to the relay AMF entity by using a response message.

It should be noted that, as the relay UE currently is connected to or serves a plurality of remote UEs, that is, there are a plurality of remote UEs, the relay UE may transmit the relay AMF entity a list of identifier information of the plurality of remote UEs.

In a possible situation, in Step 3a, if the identifier information of the remote UE provided by the relay UE is 5G-GUTI or 5G-S-TMSI of the remote UE, the relay AMF entity may retrieve information of the remote AMF entity based on the 5G-GUTI or 5G-S-TMSI of the remote UE, interact with the remote AMF entity based on the retrieved information to obtain a context of the remote UE from the remote AMF entity, and determine, based on the context of the remote UE, whether the remote UE is granted to implement UE-to-network relay communication.

In another possible situation, in Step 3b, if the identifier information of the remote UE provided by the relay UE is SUCI or SUPI of the remote UE, the relay AMF entity may obtain grant information for the remote UE through interaction with a UDM entity, so as to determine, based on the grant information for the remote UE, whether the remote UE is granted to implement UE-to-network relay communication.

Embodiment 2: The first core network device is a relay AMF entity, and the first UE is a relay UE; and the second core network device is a remote core network device, the second UE is a remote UE, and the first device is a RAN of the relay UE.

In Embodiment 2, the relay AMF entity obtains from the RAN identifier information of the remote UE (for example, 5G-GUTI of the remote UE), retrieves information of the remote AMF entity based on the identifier information of the remote UE, and interacts with the remote AMF entity to obtain a context of the remote UE, so as to authenticate the remote UE.

Figure 4:
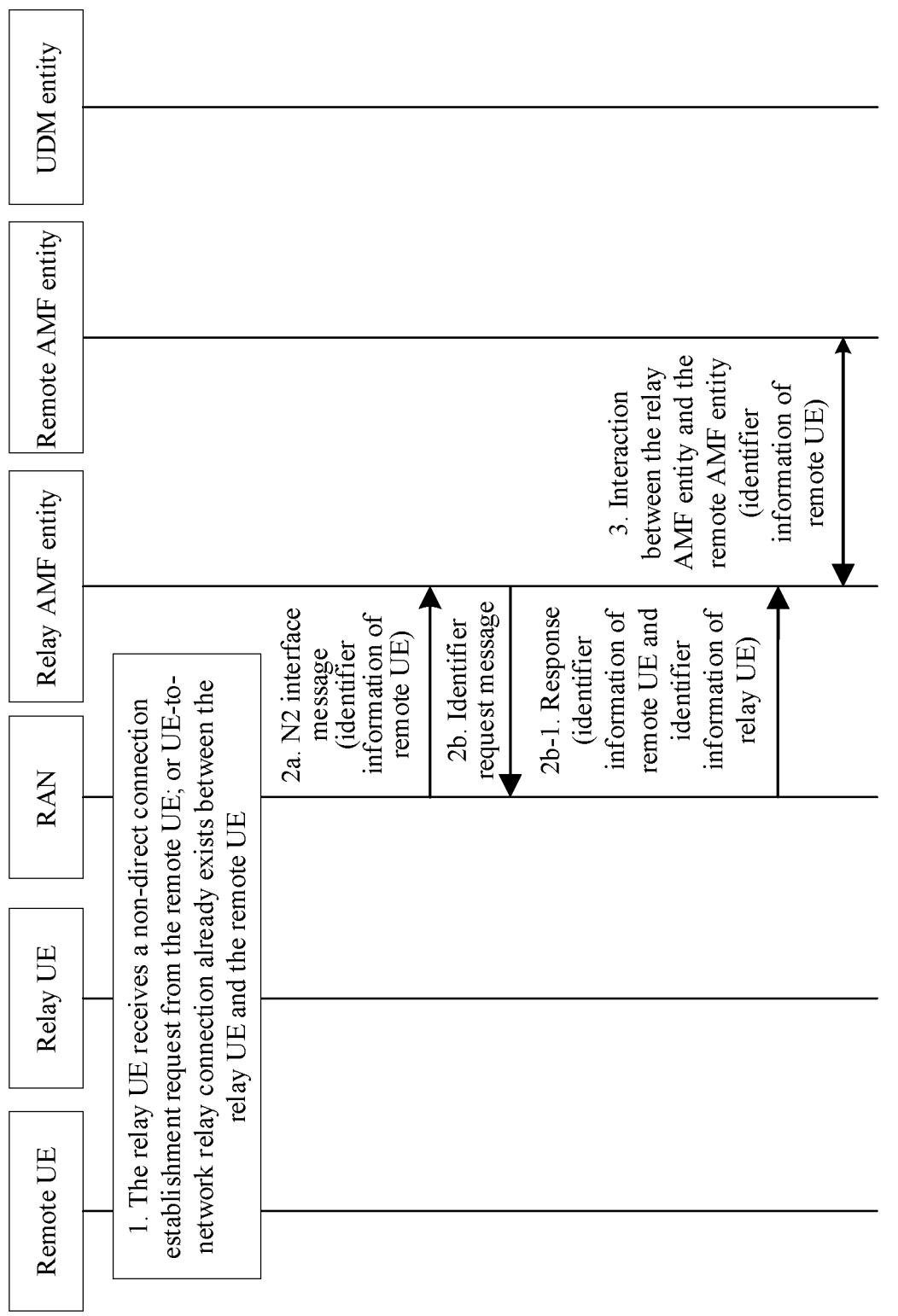
FIG. 4 is a second schematic flowchart of application of a device interaction method according to an embodiment of this application.

The following describes Embodiment 2 with reference to FIG. 4.

As shown in FIG. 4, in Step 1, the relay UE receives a non-direct connection establishment request from the remote UE; or UE-to-network relay connection already exists between the relay UE and the remote UE.

In an implementation, in Step 2a, the RAN transmits identifier information of the remote UE to the relay AMF entity by using an N2 interface message.

The identifier information of the remote UE may be 5G-GUTI, 5G-S-TMSI, application layer identity, or PRUK ID of the remote UE.

In another implementation, in Step 2b, the relay AMF entity transmits an identifier request (identifier request) message to the RAN, where the identifier request message is used to request the RAN to provide identifier information of a remote UE that is currently associated with the relay UE for UE-to-network relay communication, and the identifier request message may carry (include) identifier information of the relay UE, for example, 5G-GUTI or 5G-S-TMSI of the relay UE.

In Step 2b-1, after receiving the identifier request message sent by the relay AMF entity, the RAN transmits a response (response) message to the relay AMF entity, where the response message may carry (include) identifier information of the remote UE or the identifier information of the relay UE (for example, 5G-GUTI or 5G-S-TMSI of the relay UE).

It should be noted that, as the relay UE currently is connected to or serves a plurality of remote UEs, that is, there are a plurality of remote UEs, the RAN may transmit the relay AMF entity a list of identifier information of the plurality of remote UEs.

In Step 3, if the identifier information of the remote UE provided by the RAN is 5G-GUTI or 5G-S-TMSI of the remote UE, the relay AMF entity may retrieve information of the remote AMF entity based on the 5G-GUTI or 5G-S-TMSI of the remote UE, interact with the remote AMF entity based on the retrieved information to obtain a context of the remote UE from the remote AMF entity, and determine, based on the context of the remote UE, whether the remote UE is granted to implement UE-to-network relay communication.

Embodiment 3: The first core network device is a remote AMF entity, and the first UE is a remote UE; and the second core network device is a relay core network device, the second UE is a relay UE, and the first device is the remote UE.

In Embodiment 3, the remote AMF entity obtains from the remote UE identifier information of the relay UE (for example, 5G-GUTI of the relay UE), retrieves information of the relay AMF entity based on the identifier information of the relay UE, and interacts with the relay AMF entity to obtain a context of the relay UE, so as to authenticate the relay UE.

Figure 5:
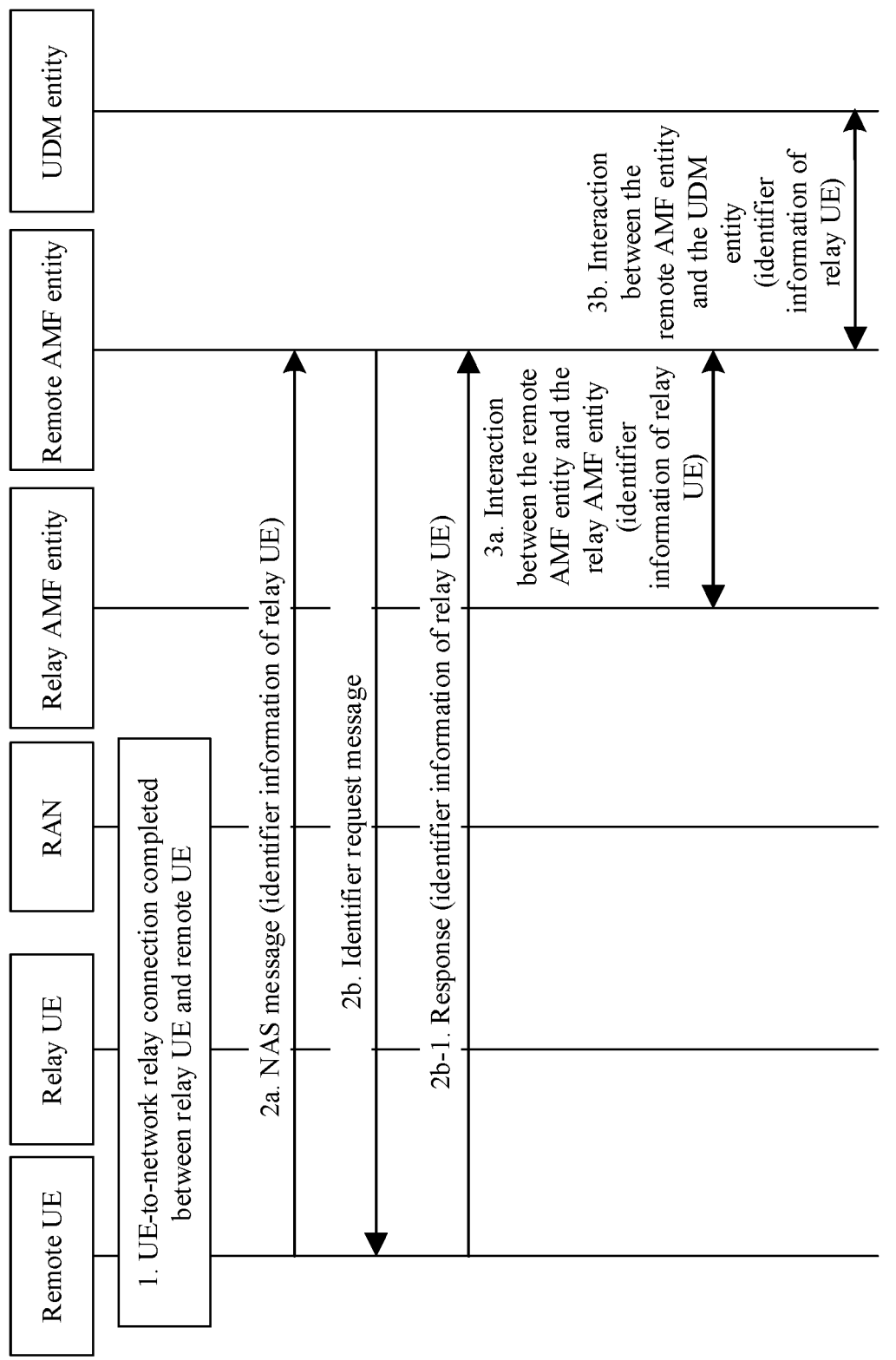
FIG. 5 is a third schematic flowchart of application of a device interaction method according to an embodiment of this application.

The following describes Embodiment 3 with reference to FIG. 5.

As shown in FIG. 5, in Step 1, the relay UE has completed establishment of UE-to-network relay connection with the remote UE, that is, UE-to-network relay connection already exists between the relay UE and the remote UE.

In an implementation, in Step 2a, the remote UE transmits identifier information of the relay UE to the remote AMF entity by using a NAS message.

The identifier information of the relay UE may be 5G-GUTI, 5G-S-TMSI, PEI, SUCI, application layer identity, PRUK ID, SUPI, or the like of the relay UE.

In another implementation, in Step 2b, the remote AMF entity transmits an identifier request (identifier request) message to the remote UE, where the identifier request message is used to request the remote UE to provide identifier information of a relay UE that is currently serving the remote UE.

In Step 2b-1 after receiving the identifier request message sent by the remote AMF entity, the remote UE transmits identifier information of the relay UE to the remote AMF entity by using a response message.

It should be noted that, as there may be a plurality of relay UEs serving the remote UE, the RAN may transmit the remote AMF entity a list of identifier information of the plurality of relay UEs.

In a possible situation, in Step 3a, if the identifier information of the relay UE provided by the remote UE is 5G-GUTI or 5G-S-TMSI of the relay UE, the remote AMF entity may retrieve information of the relay AMF entity based on the 5G-GUTI or 5G-S-TMSI of the relay UE, interact with the relay AMF entity based on the retrieved information to obtain a context of the relay UE from the relay AMF entity, and determine, based on the context of the relay UE, whether the relay UE is granted to implement UE-to-network relay communication.

In another possible situation, in Step 3b, if the identifier information of the relay UE provided by the remote UE is SUCI or SUPI of the relay UE, the remote AMF entity may obtain grant information for the relay UE through interaction with a UDM entity, so as to determine, based on the grant information for the relay UE, whether the relay UE is granted to implement UE-to-network relay communication.

Embodiment 4: The first core network device is a remote AMF entity, and the first UE is a remote UE; and the second core network device is a relay core network device, the second UE is a relay UE, and the first device is a RAN of the relay UE.

In Embodiment 4, the remote AMF entity obtains from the RAN identifier information of the relay UE (5G-S-TMSI of the relay UE), retrieves information of the relay AMF entity based on the identifier information of the relay UE, and interacts with the relay AMF entity to obtain a context of the relay UE, so as to authenticate the relay UE.

Figure 6:
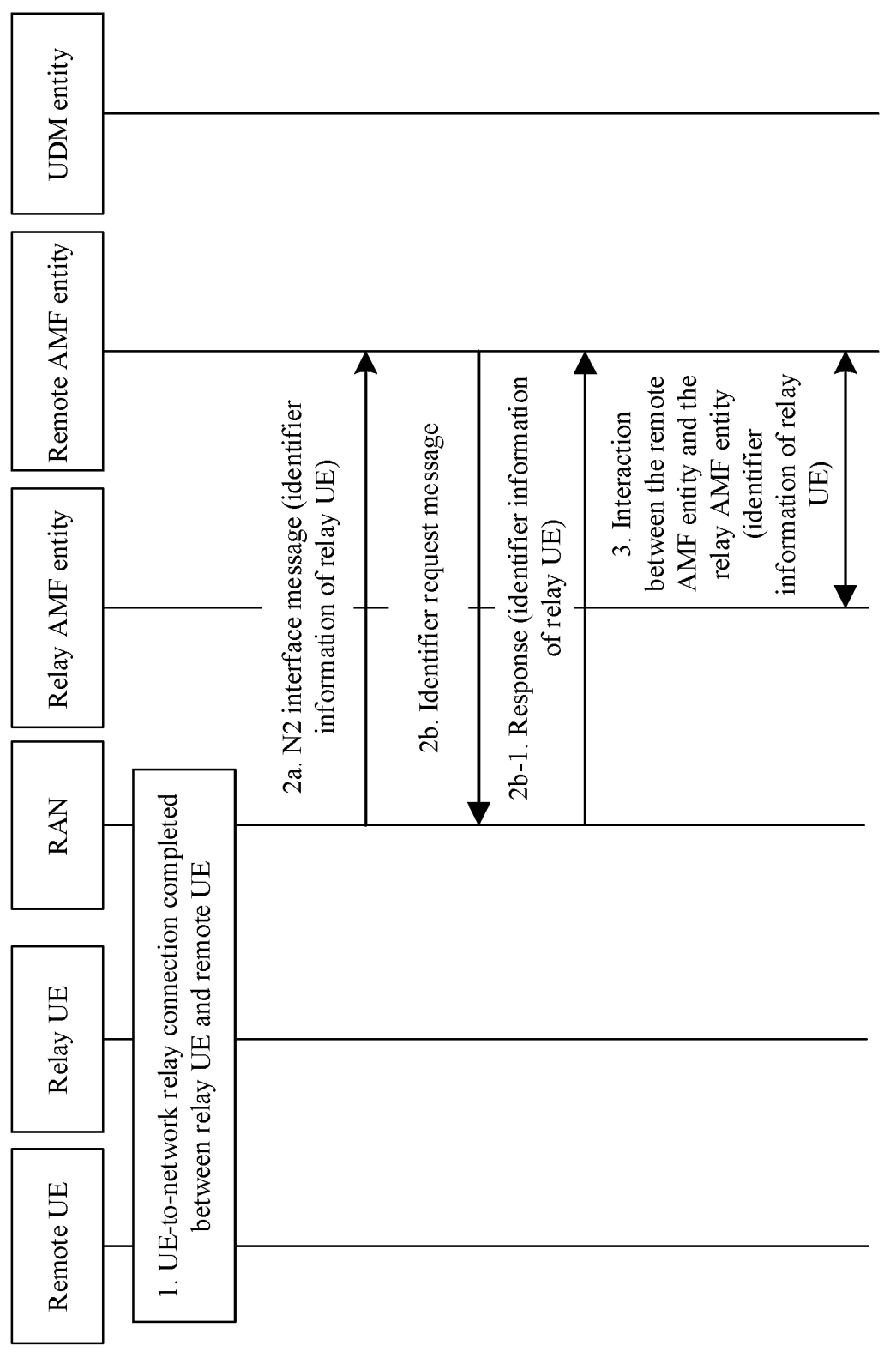
FIG. 6 is a fourth schematic flowchart of application of a device interaction method according to an embodiment of this application.

The following describes Embodiment 4 with reference to FIG. 6.

As shown in FIG. 6, in Step 1, the relay UE has completed establishment of UE-to-network relay connection with the remote UE, that is, UE-to-network relay connection already exists between the relay UE and the remote UE.

In an implementation, in Step 2a, the RAN transmits identifier information of the relay UE to the remote AMF entity by using an N2 interface message.

The identifier information of the relay UE may be 5G-GUTI, 5G-S-TMSI, application layer identity, or PRUK ID of the relay UE.

In another implementation, in Step 2b, the remote AMF entity transmits an identifier request (identifier request) message to the RAN, where the identifier request message is used to request the RAN to provide identifier information of a relay UE that is currently serving the remote UE, and the identifier request message may carry (include) identifier information of the remote UE, for example, 5G-GUTI or 5G-S-TMSI of the remote UE.

In step 2b-1, after receiving the identifier request message sent by the remote AMF entity, the RAN transmits a response (response) message to the remote AMF entity, where the response message may carry (include) the identifier information of the relay UE or the identifier information of the remote UE (for example, 5G-GUTI or 5G-S-TMSI of the remote UE).

It should be noted that, as there may be a plurality of relay UEs serving the remote UE, the RAN may transmit the remote AMF entity a list of identifier information of the plurality of relay UEs.

In Step 3, if the identifier information of the relay UE provided by the RAN is 5G-GUTI or 5G-S-TMSI of the relay UE, the remote AMF entity may retrieve information of the relay AMF entity based on the 5G-GUTI or 5G-S-TMSI of the relay UE, interact with the relay AMF entity based on the retrieved information to obtain a context of the relay UE from the relay AMF entity, and determine, based on the context of the relay UE, whether the relay UE is granted to implement UE-to-network relay communication.

Figure 7:
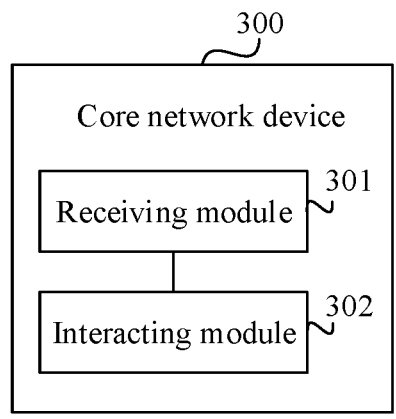
FIG. 7 is a schematic structural diagram of a core network device according to an embodiment of this application.

As shown in FIG. 7, an embodiment of this application provides a core network device 300. The core network device is a first core network device, and the core network device 300 includes a receiving module 301 and an interacting module 302. The receiving module 301 is configured to receive identifier information of at least one UE sent by a first device, where the at least one UE includes at least one of the following: a UE that has established UE-to-network relay connection with a first UE and a UE that is to establish UE-to-network relay connection with the first UE; and the interacting module 302 is configured to: after the receiving module 301 receives the identifier information of the at least one UE, interact with a second core network device based on identifier information of a second UE, where the second UE is any one of the at least one UE; where the first core network device is a core network device serving the first UE, and the second core network device is a core network device serving the second UE.

Optionally, the interacting module may further include a determining submodule, a transmitting submodule, and a receiving submodule; where the determining submodule is configured to determine the second core network device based on the identifier information of the second UE; the transmitting submodule is configured to transmit a first request message to the second core network device determined by the determining submodule, where the first request message carries the identifier information of the second UE, and the first request message is used to request to obtain a context of the second UE; and the receiving submodule is configured to: after the transmitting submodule transmits the first request message to the second core network device, receive the context of the second UE sent by the second core network device.

Optionally, the core network device further includes a determining module, and the determining module is configured to: after the receiving submodule receives the context of the second UE sent by the second core network device, determine, based on the context of the second UE, whether the second UE is granted to implement UE-to-network relay communication.

Optionally, the core network device further includes a transmitting module, and the transmitting module is configured to: before the receiving module receives the identifier information of the second UE sent by the first device, transmit an identifier request message to the first device, where the identifier request message is used to request to obtain identifier information of the UE that has established and/or is to establish UE-to-network relay connection with the first UE.

Optionally, the first device is the first UE or an access network device, the access network device serves a relay UE, and the relay UE is the first UE or the second UE.

Optionally, the identifier information of the at least one UE is carried in a NAS message, an N2 interface message, or a response message corresponding to an identifier request message.

Optionally, identifier information of any one of the at least one UE is any one of the following:

a 5G-GUTI;

a 5G-S-TMSI;

an application layer identity;

a PRUK ID;

a PEI;

a SUCI; and a SUPI.

Optionally, the first core network device further includes a transmitting module and a determining module; the transmitting module is configured to: after the receiving module receives the identifier information of the at least one UE sent by the first device, transmit a second request message to a third core network device, where the second request message carries the identifier information of the second UE, and the second request message is used to request to obtain grant information for the second UE; the receiving module is further configured to receive the grant information for the second UE sent by the third core network device; and the determining module is configured to determine, based on the grant information for the second UE, whether the second UE is granted to implement UE-to-network relay communication.

The core network device provided in this embodiment of this application can implement the processes performed by the first network device shown in the foregoing embodiments of the device interaction method, with the same technical effects achieved. To avoid repetition, details are not described herein again.

This embodiment of this application provides a core network device, where the core network device is a first core network device, and the core network device includes a receiving module and an interacting module. The receiving module is configured to receive identifier information of at least one UE sent by a first device, where the at least one UE includes at least one of the following: a UE that has established UE-to-network relay connection with a first UE and a UE that is to establish UE-to-network relay connection with the first UE; and the interacting module is configured to: after the receiving module 301 receives the identifier information of the at least one UE, interact with a second core network device based on identifier information of a second UE, where the second UE is any one of the at least one UE; where the first core network device is a core network device serving the first UE, and the second core network device is a core network device serving the second UE. In UE-to-network relay communication, a core network device serving UE can be determined based on identifier information of the UE. Therefore, a first core network device can determine, based on received identifier information of at least one UE, a second core network device serving a UE in the at least one UE, so as to interact with the second core network device. For example, a relay core network device can implement interaction with a remote core network device serving a remote UE based on received identifier information of the remote UE, or a remote core network device can implement interaction with a relay core network device serving a relay UE based on received identifier information of the relay UE. In this way, interaction between a relay core network device and a remote core network device can be implemented through the device interaction method provided in the embodiments of this application.

Figure 8:
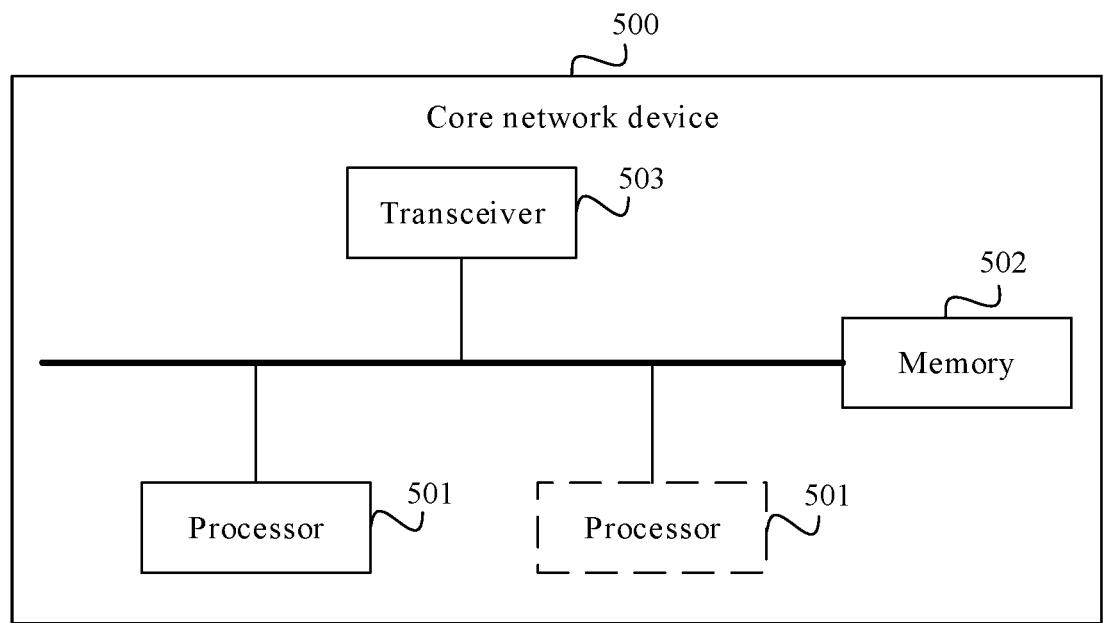
FIG. 8 is a schematic diagram of hardware of a core network device according to an embodiment of this application.

Optionally, an embodiment of this application further provides a core network device, including a processor 501, a memory 502, and a program or instructions stored in the memory 502 and capable of running on the processor 501, as shown in FIG. 8. When the program or instructions are executed by the processor 501, the processes of the foregoing embodiments of the device interaction method are implemented, with the same technical effects achieved. To avoid repetition, details are not described herein again.

FIG. 8 is a schematic diagram of hardware of a core network device according to an embodiment of this application. As shown in FIG. 8, the core network device 500 may include: one or more processors 501, a memory 502, and a transceiver 503.

The transceiver 503 may be configured to: receive identifier information of at least one UE sent by a first device, where the at least one UE includes at least one of the following: a UE that has established UE-to-network relay connection with a first UE and a UE that is to establish UE-to-network relay connection with the first UE; and interact with a second core network device based on identifier information of a second UE, where the second UE is any one of the at least one UE; where the first core network device is a core network device serving the first UE, and the second core network device is a core network device serving the second UE.

Optionally, the processor 501 may be configured to determine, based on the identifier information of the second UE, the second core network device; and the transceiver 503 is configured to transmit a first request message to the second core network device determined by the processor 501 and receive a context of the second UE sent by the second core network device, where the first request message carries the identifier information of the second UE, and the first request message is used to request to obtain a context of the second UE.

Optionally, the processor 501 may be further configured to: after the transceiver 503 receives the context of the second UE sent by the second core network device, determine, based on the context of the second UE, whether the second UE is granted to implement UE-to-network relay communication.

Optionally, the transceiver 503 may be further configured to: before receiving the context of the second UE sent by the first device, transmit an identifier request message to the first device, where the identifier request message is used to request to obtain identifier information of a UE that has established and/or is to establish UE-to-network relay connection with the first UE.

Optionally, the first device is the first UE or an access network device, the access network device serves a relay UE, and the relay UE is the first UE or the second UE.

Optionally, the identifier information of the at least one UE is carried in a NAS message, an N2 interface message, or a response message corresponding to an identifier request message.

Optionally, identifier information of any one of the at least one UE is any one of the following:

a 5G-GUTI;

a 5G-S-TMSI;

an application layer identity;

a PRUK ID;

a PEI;

a SUCI; and a SUPI.

Optionally, the transceiver 503 may be further configured to: after receiving the identifier information of the at least one UE sent by the first device, transmit a second request message to a third core network device and receive grant information for the second UE sent by the third core network device, where the second request message carries the identifier information of the second UE, and the second request message is used to request to obtain grant information for the second UE; and the processor 501 is configured to determine, based on the grant information for the second UE received by the transceiver 503, whether the second UE is granted to implement UE-to-network relay communication.

This embodiment of this application provides a core network device, where the core network device is a first core network device, and a transceiver of the core network device may be configured to receive identifier information of at least one UE sent by a first device, where the at least one UE includes at least one of the following: a UE that has established UE-to-network relay connection with a first UE and a UE that is to establish UE-to-network relay connection with the first UE; and interact with a second core network device based on identifier information of a second UE, where the second UE is any one of the at least one UE; where the first core network device is a core network device serving the first UE, and the second core network device is a core network device serving the second UE. In UE-to-network relay communication, a core network device serving a UE can be determined based on identifier information of the UE. Therefore, a first core network device can determine, based on received identifier information of at least one UE, a second core network device serving a UE in the at least one UE, so as to interact with the second core network device. For example, a relay core network device can implement interaction with a remote core network device serving a remote UE based on received identifier information of the remote UE, or a remote core network device can implement interaction with a relay core network device serving a relay UE based on received identifier information of the relay UE. In this way, interaction between a relay core network device and a remote core network device can be implemented through the device interaction method provided in the embodiments of this application.

It can be understood that, in the embodiments of this application, the receiving module 301, the interacting module 302 and the transmitting module in the foregoing schematic structural diagram (for example, FIG. 7) of the core network device may be implemented by the transceiver 503;

and the determining module in the core network device may be implemented by the processor 501.

It should be noted that one processor 501 of the two processors 501 in FIG. 8 is denoted by dashed lines to indicate that there may be one or more processors 501 in the core network device. In FIG. 8, the core network device including two processors 501 is used as an example for description.

It can be understood that, in this embodiment of this application, the network core device 500 may be a relay core network device 01 or a remote core network device 03 in a communication system shown in FIG. 1 in the foregoing embodiments.

An embodiment of this application further provides a readable storage medium, where the readable storage medium stores a program or instructions, and when the program or instructions are executed by the processor 501 shown in FIG. 8, the processes performed by the first network device shown in the foregoing embodiments of the device interaction method are implemented, with the same technical effects achieved. To avoid repetition, details are not described herein again.

The processor may be a processor in a UE or in a network device in the foregoing embodiments. The readable storage medium may include a computer-readable storage medium such as a read-only memory (read-only memory, ROM), a random access memory (random access memory, RAM), a magnetic disk, or an optical disc.

An embodiment of this application still further provides a chip. The chip includes a processor and a communication interface, where the communication interface is coupled to the processor, and the processor is configured to run a program or instructions, so that the processes in the foregoing embodiments of the device interaction method are implemented, with the same technical effects achieved. To avoid repetition, details are not described herein again.

It can be understood that the chip provided in this embodiment of this application may also be referred to as a system-level chip, a system on chip, a chip system, a system-on-a-chip, or the like.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

In addition, it should be noted that the scope of the method and apparatus in the implementations of this application is not limited to performing functions in the shown or discussed order, but may also include performing functions in a substantially simultaneous manner or in a reverse order depending on the functions involved. For example, the described method may be performed in an order different from that described, and steps may be added, omitted, or combined. In addition, features described with reference to some examples may be combined in other examples.

According to the foregoing description of the implementations, a person skilled in the art may clearly understand that the method in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially, or the part contributing to the prior art may be implemented in a form of a software product. The software product is stored in a storage medium (for example, ROM/RAM, a magnetic disk, or an optical disc) and includes several instructions for instructing a terminal (which may be a mobile phone, a computer, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A device interaction method, comprising:

receiving, by a first core network device, identifier information of at least one user equipment (UE) from a relay UE, wherein the at least one UE comprises at least one of the following: an UE that has established UE-to-network relay connection with the relay UE and an UE that is to establish UE-to-network relay connection with the relay UE; and interacting, by the first core network device based on identifier information of a second UE, with a second core network device, wherein the second UE is any one of the at least one UE; wherein the first core network device is a core network device serving the relay UE, and the second core network device is a core network device serving the second UE, wherein the interacting, by the first core network device based on identifier information of second UE, with a second core network device comprises:

determining, by the first core network device based on the identifier information of the second UE, the second core network device;

transmitting, by the first core network device, a first request message to the second core network device, wherein the first request message carries the identifier information of the second UE, and the first request message is used to request to obtain a context of the second UE; and receiving, by the first core network device, the context of the second UE sent by the second core network device.

2. The method according to claim 1, wherein after the receiving, by the first core network device, the context of the second UE sent by the second core network device, the method further comprises:

determining, by the first core network device based on the context of the second UE, whether the second UE is granted to implement UE-to-network relay communication.

3. The method according to claim 1, wherein before the receiving, by a first core network device, identifier information of at least one UE sent by the relay UE, the method further comprises:

transmitting, by the first core network device, an identifier request message to the relay UE, wherein the identifier request message is used to request to obtain identifier information of a UE that has established and/or is to establish UE-to-network relay connection with the relay UE.

4. The method according to claim 1, wherein the identifier information of the at least one UE is carried in a non-access stratum NAS message, an N2 interface message, or a response message corresponding to an identifier request message.

5. The method according to claim 1, wherein identifier information of any one of the at least one UE is any one of the following:

a 5G globally unique temporary identifier (5G-GUTI);

a 5G S-temporary mobile subscriber identifier (5G-S-TMSI);

an application layer identity;

a prose relay user key identity (PRUK ID);

a permanent equipment identifier (PEI);

a subscription concealed identifier (SUCI); and a subscription permanent identifier (SUPI).

6. The method according to claim 1, wherein after the receiving, by a first core network device, identifier information of at least one UE sent by the relay UE, the method further comprises:

transmitting, by the first core network device, a second request message to a third core network device, wherein the second request message carries the identifier information of the second UE, and the second request message is used to request to obtain grant information for the second UE;

receiving, by the first core network device, grant information for the second UE sent by the third core network device; and determining, by the first core network device based on the grant information for the second UE, whether the second UE is granted to implement UE-to-network relay communication.

7. A core network device, comprising:

a processor; and a memory storing a program or instructions that is capable of running on the processor, wherein the program or the instructions, when executed by the processor, causes the core network device to perform the following steps receiving identifier information of at least one user equipment (UE) from a relay UE, wherein the at least one UE comprises at least one of the following: an UE that has established UE-to-network relay connection with the relay UE and an UE that is to establish UE-to-network relay connection with the relay UE; and interacting, based on identifier information of a second UE, with a second core network device, wherein the second UE is any one of the at least one UE; wherein the core network device is a core network device serving the relay UE, and the second core network device is a core network device serving the second UE, wherein the interacting, based on identifier information of second UE, with a second core network device comprises:

determining, based on the identifier information of the second UE, the second core network device;

transmitting a first request message to the second core network device, wherein the first request message carries the identifier information of the second UE, and the first request message is used to request to obtain a context of the second UE; and receiving the context of the second UE sent by the second core network device.

8. The core network device according to claim 7, wherein after the receiving the context of the second UE sent by the second core network device, the program or the instructions causes the core network device to further perform the following step:

> determining, based on the context of the second UE, whether the second UE is granted to implement UE-to-network relay communication.

9. The core network device according to claim 7, wherein before the receiving identifier information of at least one UE sent by the relay UE, the program or the instructions causes the core network device to further perform the following step:

> transmitting an identifier request message to the relay UE, wherein the identifier request message is used to request to obtain identifier information of a UE that has established and/or is to establish UE-to-network relay connection with the relay UE.

10. The core network device according to claim 7, wherein the identifier information of the at least one UE is carried in a non-access stratum NAS message, an N2 interface message, or a response message corresponding to an identifier request message.

11. The core network device according to claim 7, wherein identifier information of any one of the at least one UE is any one of the following:

> a 5G globally unique temporary identifier (5G-GUTI);
> a 5G S-temporary mobile subscriber identifier (5G-S-TMSI);
> an application layer identity;
> a prose relay user key identity (PRUK ID);
> a permanent equipment identifier (PEI);
> a subscription concealed identifier (SUCI); and
> a subscription permanent identifier (SUPI).

12. The core network device according to claim 7, wherein after the receiving identifier information of at least one UE sent by the relay UE, the program or the instructions causes the core network device to further perform the following step:

> transmitting a second request message to a third core network device, wherein the second request message carries the identifier information of the second UE, and the second request message is used to request to obtain grant information for the second UE;
> receiving grant information for the second UE sent by the third core network device; and
> determining, based on the grant information for the second UE, whether the second UE is granted to implement UE-to-network relay communication.

13. A non-transitory readable storage medium storing a program or instructions, wherein the program or the instructions, when executed by a processor, performs the following steps:

> receiving, by a first core network device, identifier information of at least one user equipment (UE) from a relay UE, wherein the at least one UE comprises at least one of the following: an UE that has established UE-to-network relay connection with the relay UE and an UE that is to establish UE-to-network relay connection with the relay UE; and > interacting, by the first core network device based on identifier information of a second UE, with a second core network device, wherein the second UE is any one of the at least one UE; wherein the first core network device is a core network device serving the relay UE, and the second core network device is a core network device serving the second UE, wherein the interacting, by the first core network device based on identifier information of second UE, with a second core network device comprises:

> determining, by the first core network device based on the identifier information of the second UE, the second core network device;
> transmitting, by the first core network device, a first request message to the second core network device, wherein the first request message carries the identifier information of the second UE, and the first request message is used to request to obtain a context of the second UE; and
> receiving, by the first core network device, the context of the second UE sent by the second core network device.

14. The non-transitory readable storage medium according to claim 13, wherein before the receiving, by a first core network device, identifier information of at least one UE sent by the relay UE, the program or the instructions further performs the following step:

> transmitting, by the first core network device, an identifier request message to the relay UE, wherein the identifier request message is used to request to obtain identifier information of a UE that has established and/or is to establish UE-to-network relay connection with the relay UE.

15. The non-transitory readable storage medium according to claim 13, wherein after the receiving, by a first core network device, identifier information of at least one UE sent by the relay UE, the program or the instructions further performs the following steps:

> transmitting, by the first core network device, a second request message to a third core network device, wherein the second request message carries the identifier information of the second UE, and the second request message is used to request to obtain grant information for the second UE;
> receiving, by the first core network device, grant information for the second UE sent by the third core network device; and
> determining, by the first core network device based on the grant information for the second UE, whether the second UE is granted to implement UE-to-network relay communication.

* * * * *